(12) United States Patent
Wang et al.

(10) Patent No.: US 6,513,128 B1
(45) Date of Patent: Jan. 28, 2003

(54) NETWORK INTERFACE CARD ACCESSIBLE DURING LOW POWER CONSUMPTION MODE

(75) Inventors: Chi-Lie Wang, Sunnyvale, CA (US); Eric Davis, Sunnyvale, CA (US); Nathan Henderson, San Jose, CA (US); Jeffrey Ross, San Jose, CA (US)

(73) Assignee: 3COM Corporation, Santa Clara, CA (US)

( * ) Notice: Subject to any disclaimer, the term of this patent is extended or adjusted under 35 U.S.C. 154(b) by 0 days.

(21) Appl. No.: 09/451,485

(22) Filed: Nov. 30, 1999

(51) Int. Cl.$^7$ .............................. G06F 1/04; G06F 1/32
(52) U.S. Cl. ...................... 713/600; 713/322; 713/500
(58) Field of Search ................................. 713/200, 310, 713/322, 500, 600

(56) References Cited

U.S. PATENT DOCUMENTS

| | | | | |
|---|---|---|---|---|
| 5,388,265 A | * | 2/1995 | Volk ............................ | 713/322 |
| 5,404,544 A | * | 4/1995 | Crayford ...................... | 713/310 |
| 5,671,355 A | * | 9/1997 | Collins ......................... | 709/250 |
| 5,689,714 A | * | 11/1997 | Moyer .......................... | 713/310 |
| 5,802,305 A | * | 9/1998 | McKaughan et al. ........ | 709/227 |
| 5,938,771 A | * | 8/1999 | Williams et al. ............. | 713/310 |
| 5,983,353 A | * | 11/1999 | McHann, Jr. ................ | 713/310 |
| 6,021,493 A | * | 2/2000 | Cromer et al. ............... | 713/200 |
| 6,324,652 B1 | * | 11/2001 | Henderson et al. ........... | 713/500 |
| 6,393,570 B1 | * | 5/2002 | Henderson et al. ........... | 713/310 |

OTHER PUBLICATIONS

"3Com® EtherLink® 10/100 Mbps Desktop Network Interface Cards", product specification guide, 3Com Corporation, Santa Clara, CA, copyright 1999, 6 pages.

Toigo, J.W., "Neat NICs", *Solutions Integrator*, vol. 3, No. 4, Apr. 1999,Enabling the New Enterprise, 5 pages.

"DynamicAccess® Technology—Increasing Network Availability, Performance, Ease of Use, and Manageability", technology/services guide, 3Com Corporation, Santa Clara, CA, copyright 1999, 3 pages.

"The NEW 3Com Fast EtherLink® XL PCI For Complete PC Management", product specification guide, 3Com Corporation, Santa Clara, CA, copyright 1999, 1 page.

"DynamicAccess® Managed PC Solutions—Lower the cost of PC ownership with Desktop Management Interface (DMI 2.0s)", product specification guide, 3Com Corp., Santa Clara, CA, copyright 1999, 2 pgs.

"DynamicAccess® Managed PC Solutions—Now you can wake up PCs from a central management station", product specification guide, 3Com Corp., Santa Clara, CA, copyright 1999, 1 pg.

"Desktop Management—Centralized Control Across Distributed Systems", technology/services guide, 3Com Corp., Santa Clara, CA, copyright 1999, 11 pgs.

"3Com Managed PC Solutions—Lowering Total Cost of PC Ownership", technology/services guide, 3Com Corp., Santa Clara, CA, copyright 1999, 5 pgs.

"Introducing the 3CR990–TX–97 10/100 PCI NIC with 3XP processor", product specification guide, 3Com Corp., Santa Clara, CA, copyright 1999, 4 pgs.

(List continued on next page.)

Primary Examiner—Thomas Lee
Assistant Examiner—Chun Cao
(74) Attorney, Agent, or Firm—McDonnell Boehnen Hulbert & Berghoff

(57) ABSTRACT

The present invention allows NIC resources to be accessed through auxiliary power and an ASIC clock while the PC is powered down and while PCI power and the PCI clock are not available. The present invention also provides an alternate path for accessing the NIC registers, downloading keep-alive and alert-on-LAN packets to the transmit packet buffer (TPB), as well as uploading received packets from the receive packet buffer (RPB). The present invention also allows monitoring PCI activity and seamlessly servicing the PCI configuration cycle (when PCI power and the PCI clock are restored) in conjunction with responding to the access through the alternate path (while PCI power and the PCI clock are not available).

8 Claims, 6 Drawing Sheets

OTHER PUBLICATIONS

"10/100 Mbps Fast Ethernet PCI Network Interface Card 100 Mbps Performance Benchmark Comparison", LANQuest, Fremont, CA, Jan. 1998, 4 pages.

"3Com® Eliminates Network Problem 'Finger Pointing'", news and events, 3Com Corporation, Santa Clara, CA, Jun. 1999, 3 pages.

* cited by examiner myConfigCycle = AD[2:0] == 00 & IDSEL & CBE[3:1] == 010;

FIGURE 5

NETWORK INTERFACE CARD ACCESSIBLE DURING LOW POWER CONSUMPTION MODE

CROSS-REFERENCE TO RELATED APPLICATIONS

The present application is related to copending U.S. patent application Ser. No. 09/451,636, filed Nov. 30, 1999, entitled Method and Apparatus for Using Serial Bus for PC Management; and U.S. patent application Ser. No. 09/465,984, filed Dec. 16, 1999, entitled MultiFunction Transmit Packet Buffer. Each of the above-cited applications is incorporated herein by reference in its entirety.

BACKGROUND OF THE INVENTION

1. Field of the Invention

The present invention is directed toward a network interface card which allows access to its resources even when the host computer is turned off. More particularly, the present invention is directed toward a network interface card which provides an alternate access path to its resources when the host computer is turned off.

2. Description of Related Art

Current NICs do not allow access to resources such as its transmit packet buffer, receive packet buffer, and registers when the host computer is powered down and main power is not available. This means that the PC must be powered up for the NIC resources to be accessed and for diagnostic and other PC management functions to be performed.

Current NICs do not offer alternate paths for accessing the NIC registers other than the main interface bus, typically the PCI bus. This means that the PC must be powered up for interface power to be provided to the main interface bus, such as PCI power to the PCI bus, in order for any access to the NIC registers to take place.

What is needed is a method and apparatus for allowing NIC resources to be accessed through auxiliary power and an ASIC clock while the PC is powered down and while PCI power and the PCI clock are not available. What is also needed is an alternate path for accessing the NIC registers, downloading keep-alive and alert-on-LAN packets to the transmit packet buffer (TPB), as well as uploading received packets from the receive packet buffer (RPB). What is also needed is a method and apparatus for monitoring PCI activity and seamlessly servicing the PCI configuration cycle (when PCI power and the PCI clock are restored) in conjunction with responding to the access through the alternate path (while PCI power and the PCI clock are not available).

SUMMARY OF THE INVENTION

The present invention is directed towards a network interface card. The network interface card comprises an alternate access path for allowing access to resources of the network interface card when the network interface card is in a low power consumption mode, and a clock control for supplying an ASIC clock signal to the network interface card when the network interface card is in a low power consumption mode, the ASIC clock signal providing a clock signal for the alternate access path. The network interface card also comprises a PCI activity monitor capable of detecting a PCI configuration cycle from a PCI host addressed to the network interface card when the network interface card is in the low power consumption mode, the PCI activity monitor capable of sending a stop request to the alternate access path, the PCI activity monitor capable of sending a retry signal to the PCI host, the PCI activity monitor capable of instructing the clock control to switch from the ASIC clock signal to a PCI clock signal in response to detecting the PCI configuration cycle, the PCI clock signal providing the clock signal to the network interface card to service the PCI configuration cycle.

BRIEF DESCRIPTION OF THE DRAWINGS

FIG. 5 shows one embodiment of a set of criteria for a PCI pending decoder.

DETAILED DESCRIPTION OF THE INVENTION

The network interface card of the present invention is able to provide certain functions while running off of an alternate power source and an alternate clock signal, an ASIC clock signal to the PCI clock domain functional blocks. This scheme allows NIC resources to be accessed through an alternate path such as a serial bus. Because PCI power and the PCI clock signal may return at anytime, a PCI activity monitor with associated logic are designed so that any pending PCI configuration cycle may be serviced seamlessly in conjunction with any access through the alternate path.

The present invention allows NIC resources to be accessed through auxiliary power and an ASIC clock while the PC is powered down and while PCI power and the PCI clock are not available. The present invention also provides an alternate path for accessing the NIC registers, downloading keep-alive and alert-on-LAN packets to the TPB (transmit packet buffer), as well as uploading received packets from the RPB (receive packet buffer). The present invention also allows monitoring PCI activity and seamlessly servicing the PCI configuration cycle (when PCI power and the PCI clock are restored) in conjunction with responding to the access through the alternate path (while PCI power and the PCI clock are not available).

Figure 1:
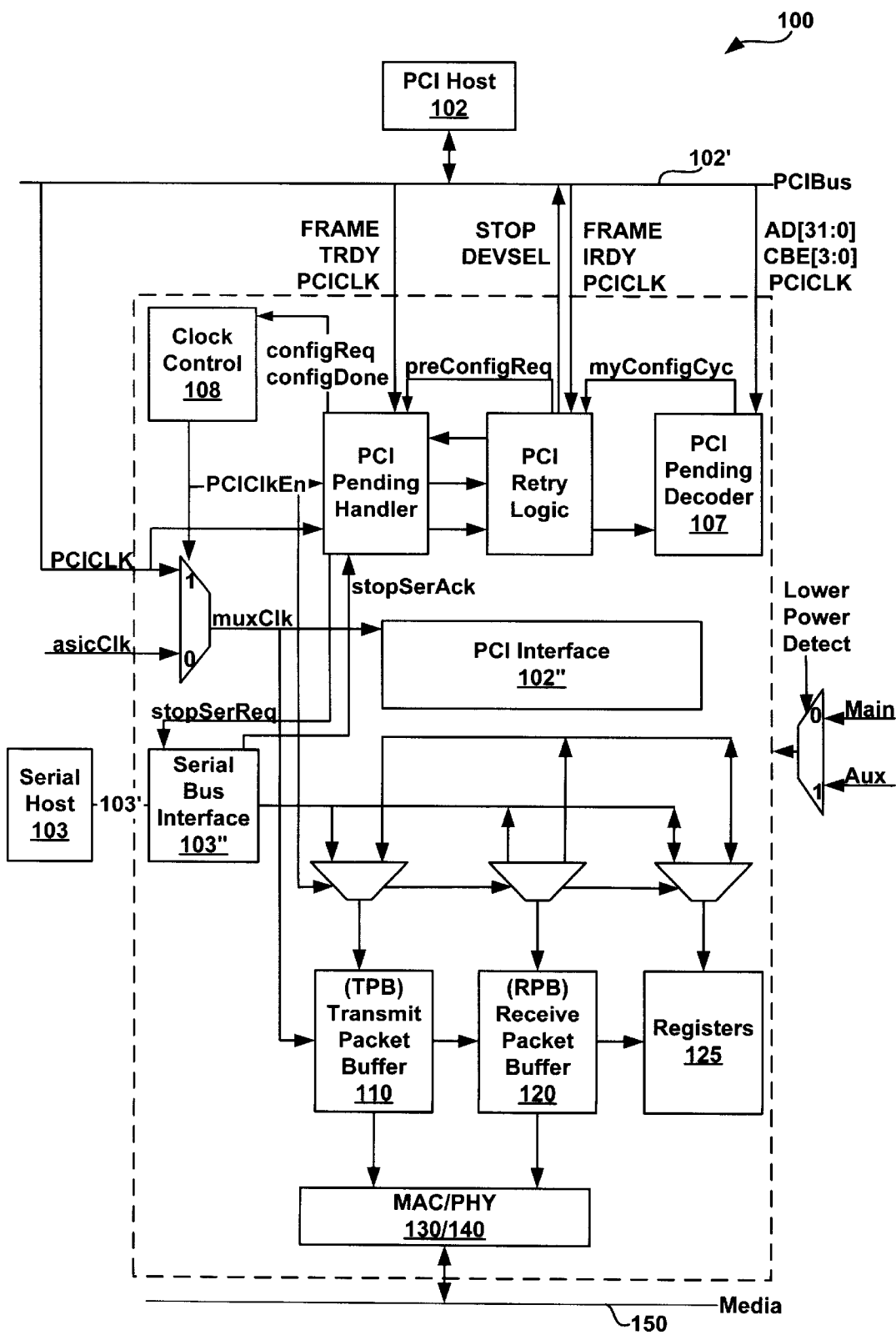
FIG. 1 shows one embodiment of a NIC of the present invention which allows use of its resources without main power.

FIG. 1 shows one embodiment of a NIC which allows use of its resources without main power. A NIC (network interface card) 100 is used to connect PCs to a network and provide a communication path to pass messages. NIC 100 may be connected to one or more hosts through one or more buses. In this example, NIC 100 is connected to a PCI (peripheral component interconnect) host 102 through a PCI bus 102' and a serial host 103 through a serial bus 103'. On the transmit side, packets are downloaded from the host memory through PCI bus 102' to a TPB (transmit packet buffer) 110. The packets are then forwarded to a MAC (media access controller) 130, which converts the packets to conform with a networking protocol such as IEEE 802.3 Data Link layer protocol. The packets are then sent through a PHY (physical layer interface) 140 and transmitted onto media 150. On the receive side, packets being received from media 150 go through PHY 140 and MAC 130 before getting written into a RPB (receive packet buffer) 120. The packets are then uploaded through PCI bus 102' to the host memory.

In order to save power, the PC may be powered down after some period of non-use, or as instructed by the user. The main power may be removed to minimize the power consumption. As the result, PCI power and the PCI clock may be turned off. If NIC 100 is acting as a wake-up device, an auxiliary power will be applied to NIC 100 with a constantly running ASIC clock may be provided to the PCI clock domain functional blocks. This scheme will allow the resources of NIC 100 to be accessed through an alternate path. Keep-alive packets may be sent out to refresh the presence of NIC 100 in the router's routing table, which will prevent NIC 100 from dropping out of the network. Alert-on-LAN packets may also be transmitted to report any encountered abnormal conditions. Finally, either receiving a wake-up event or restarting the PC will restore main power and allow the PC to return to normal operation mode.

A PCI activity monitor 104 services the PCI configuration cycle when main power is turned on. PCI activity monitor 104 includes a PCI pending handler 105, a PCI retry logic 106, and a PCI pending decoder 107. A power control switches the power from main power to auxiliary power. A clock control 108 switches the clock signal from the PCI clock signal (pciClk) to an alternate clock signal, such as an ASIC clock signal (asicClk). Clock control 108 may switch the clock signal by asserting a PCI clock enable signal (pciClkEn) which feeds the PCI clock domain functional blocks with the PCI clock signal. Clock control 108 may use an interlock scheme to prevent a clock switch in the middle of a serial bus access cycle.

Figure 2:
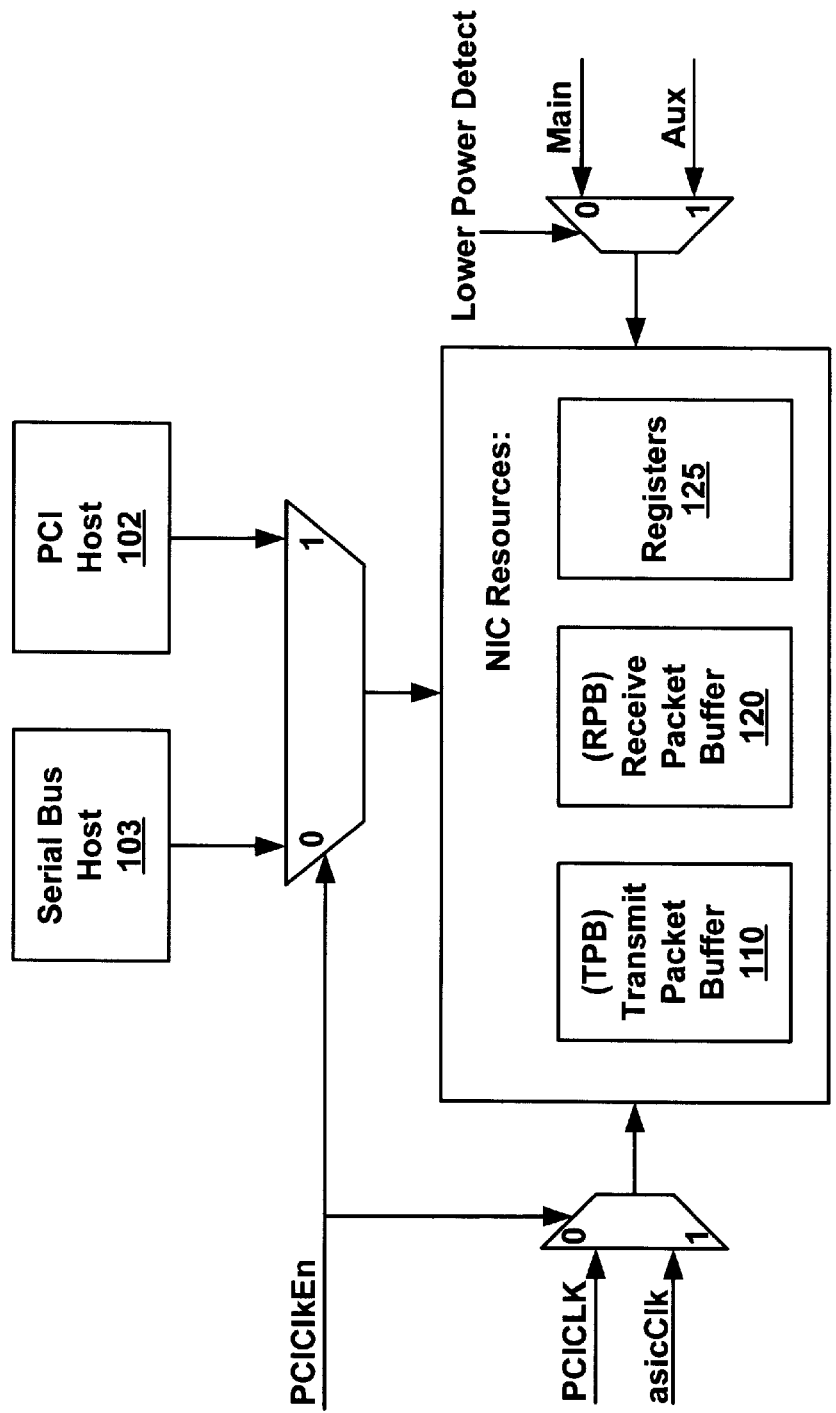
FIG. 2 shows one embodiment of NIC resource usage without main power.

FIG. 2 shows one embodiment of NIC resource usage without main power. When main power is turned off, NIC resources such as TPB 110, RPB 120, and registers 125 running off of the PCI clock (pciClk) will be switched to an ASIC clock (asicClk). A PCI clock enable signal (pciClkEn) signal will go false to indicate the ASIC clock is taking control of the PCI clock domain functional blocks. With the auxiliary power supplied, the resources will be able to be accessed through an alternate path such as serial bus 103'. This access may be used for resource diagnostics, sending out keep-alive and alert-on-LAN packets, as well as uploading received packets for system wake-up.

Figure 3:
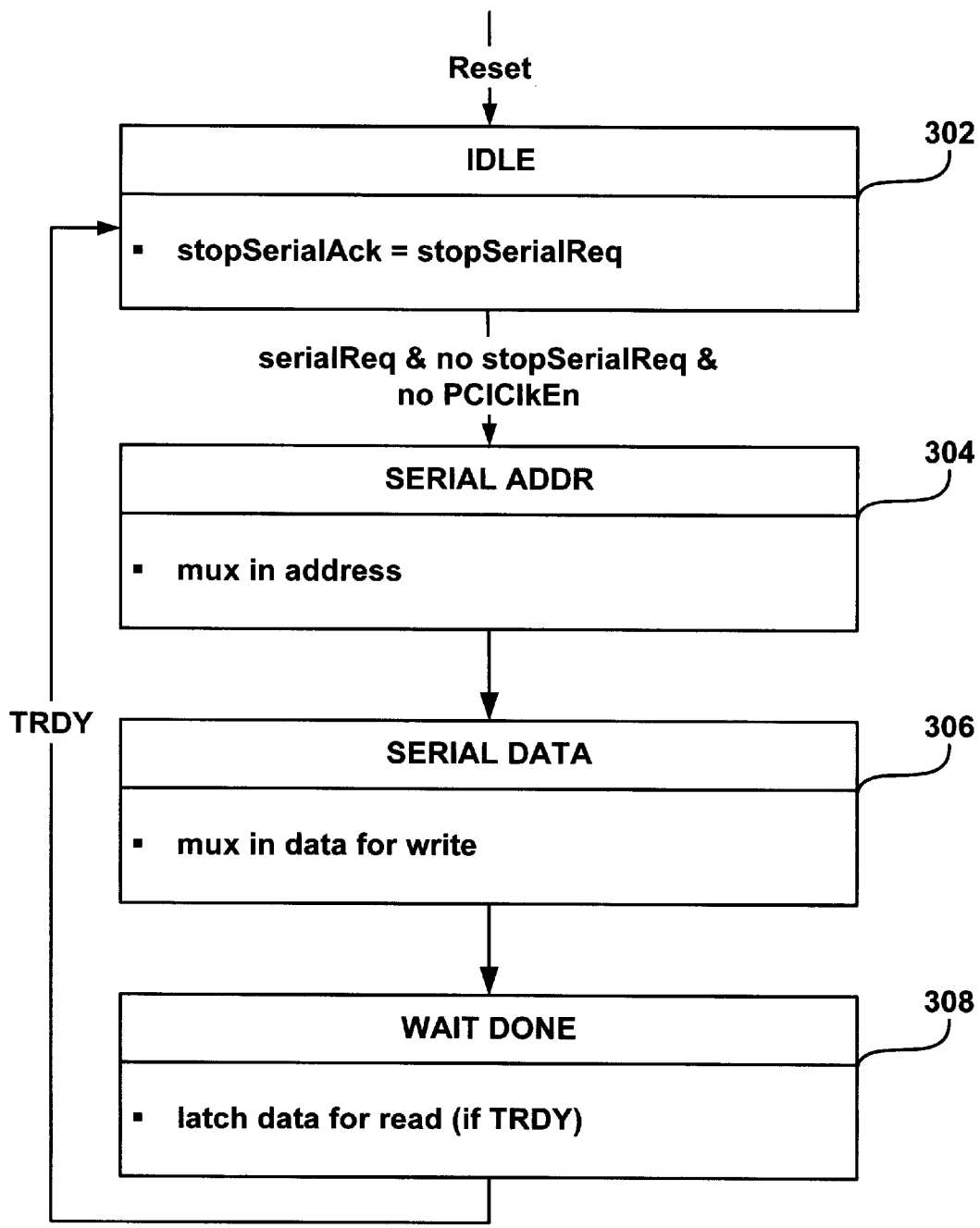
FIG. 3 shows one embodiment of a state diagram for accessing NIC resources through a serial bus.

FIG. 3 shows one embodiment of a state diagram for accessing NIC resources through a serial bus. While the PC is powered down, the auxiliary power and the ASIC clock connected to the NIC resources will allow NIC resources to be accessed through an alternate path such as serial bus 103'. Because the clock may be switched to the PCI clock upon servicing any pending PCI configuration cycles, an interlock scheme may be used to prevent a clock switch in the middle of a serial bus access cycle.

After reset, NIC 100 is in an idle state (302). NIC 100 will stay in idle state 302 so long as a stop serial request signal (stopSerialReq) is asserted to request that the clock be switched to the PCI clock to service the retried transaction. The stop serial acknowledge signal (stopSerialAck) allows the clock signal to be switched to the PCI clock and prevents serial host 103 from accessing NIC resources, because the clock cannot be switched in the middle of a serial bus initiated transaction. After the stop serial request signal is deasserted, this indicates that the clock has switched to PCI clock and the pending configuration cycle has been serviced. After the completion of the configuration cycle, the PCI clock enable signal will become false and the clock will switch back to the ASIC clock if the PC is still in the powered down mode.

When NIC 100 receives a serial bus request (serialReq), it will check to make sure there is no stop serial request signal (stopSerialReq) or PCI clock enable signal (pciClkEn). A stop serial request signal indicates that the PCI configuration cycle is pending and being retried. A PCI clock enable signal indicates that PCI power is present and NIC 100 is still runmning on the PCI clock. If there is no stop serial request or PCI clock enable signal, NIC 100 will then enter a serial address state (SERIAL_ADDR) (304) followed by a serial data state (SERIAL_DATA) (306) and multiplex in serial address and serial data. NIC 100 will enter a wait state (WAIT_DONE) (308) and wait for a target ready signal (TRDY) from PCI interface 102" before latching in the data and sending it to the serial host. NIC 100 then returns to idle state (302).

Figure 4:
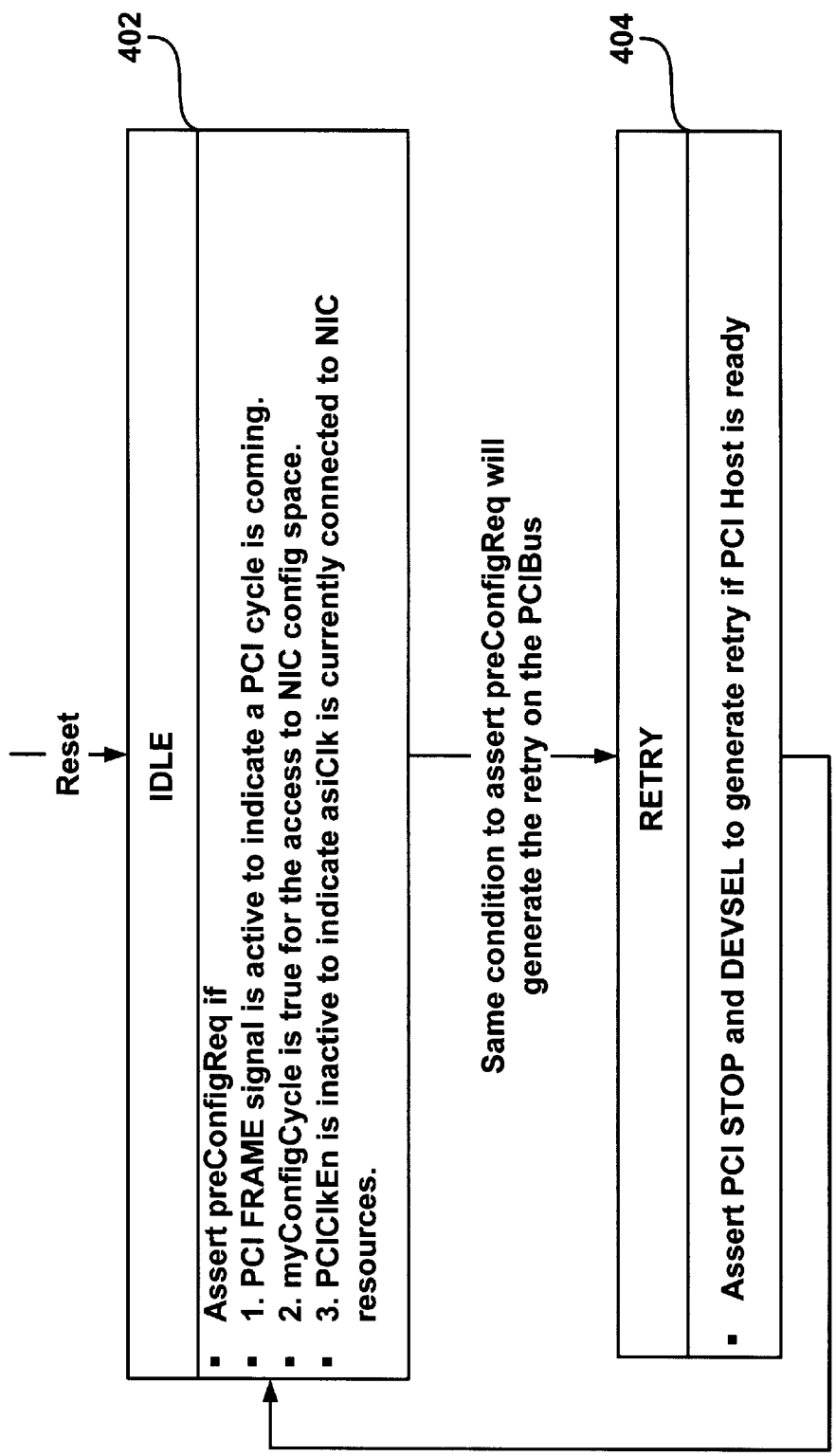
FIG. 4 shows one embodiment of a state diagram for a PCI retry logic.
Figure 5:
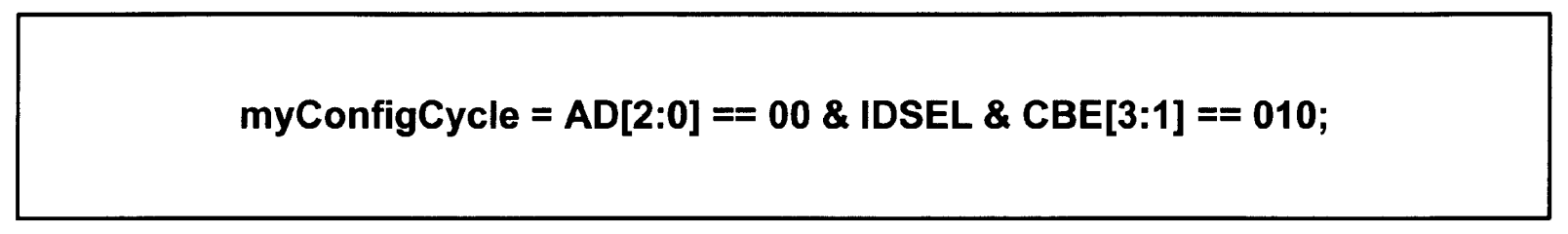
Figure 6:
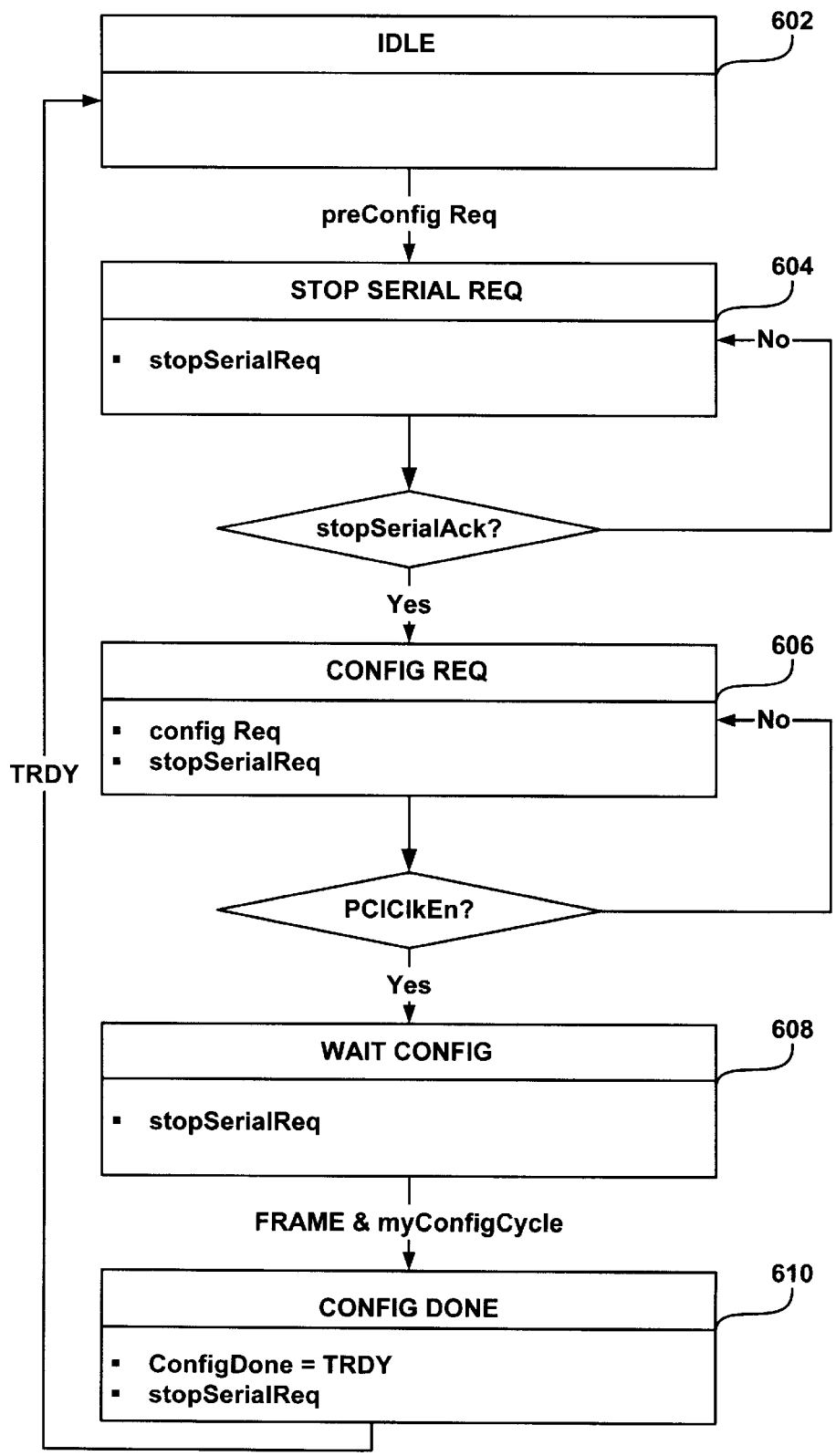
FIG. 6 shows one embodiment of a state diagram for a PCI pending handler.

FIGS. 4–6 show examples of state diagrams for a PCI activity monitor. PCI activity monitor 104 includes PCI retry logic 106, PCI pending decoder 107, and PCI pending handler 105. While the PC is powered down and the NIC resources are being accessed through an alternate path, there may be some PCI activities which appear on the PCI bus. These activities may happen only while the PCI power and the PCI clock are temporarily coming up. They may be initiated by the PCI host to access the NIC's configuration space for changing the power state. Depending on the state change, the PC may either be powered up because of receiving a wake-up event, or stay in power down mode but with a different power consumption level. Because the NIC resources may be running off of the ASIC clock to accommodate access through an alternate path, they may not be able to respond to the pending configuration cycle. PCI activity monitor 104 monitors the PCI configuration transactions, and perform a retry operation if any of them are addressing the NIC.

FIG. 4 shows one embodiment of a state diagram for a PCI retry logic. PCI retry logic 106 retries any pending PCI configuration cycles while NIC 100 is still running off of the ASIC clock. The transaction being retried will be used to notify PCI host 102 that the NIC's resources are not available to service the pending PCI configuration cycle. PCI host 102 will reissue the transaction back to NIC 100 until it is serviced. PCI retry logic 106 will also generate a preconfiguration request signal (preConfigReq) to request that the clock be switched from the ASIC clock back to the PCI clock so that the retried transaction may be serviced by NIC 100.

After reset, PCI retry logic 106 will remain in an idle state (402) and will send a preconfiguration request signal (preConfigReq) to PCI pending handler 105 only if: (1) it receives a FRAME signal from PCI host 102, (2) it receives an incoming configuration cycle signal (myConfigCycle) from PCI pending decoder 107, and (3) the PCI clock enable signal is inactive. The FRAME signal indicates that a PCI cycle is coming and PCI host 102 is trying to access NIC 100. The incoming configuration cycle signal indicates that PCI host 102 is sending a configuration cycle signal addressed specifically to the particular NIC 100. The inactive PCI clock enable signal indicates that NIC 100 is still running off of the ASIC clock. After generating a preconfiguration request signal, PCI retry logic 106 will then enter a retry state (404) and assert a retry signal (STOP and DEVSEL) to PCI host 102.

FIG. 5 shows one embodiment of a set of criteria for a PCI pending decoder. PCI pending decoder 107 detects attempts to access NIC 100 by PCI host 102 while NIC 100 is still running off of the ASIC clock, and alerts PCI activity monitor. For example, PCI pending decoder 107 may detect an attempt to access the PCI configuration space register if the following conditions are met: the lowest two PCI address bits are 00, IDSEL (initialization device select) is active, and the CBE (command, byte enable) [3:1] are 010. PCI pending decoder 107 may then send an incoming configuration signal (myConfigCycle) to PCI retry logic 106 and PCI pending handler 105.

FIG. 6 shows one embodiment of a state diagram for a PCI pending handler. PCI pending handler 105 ensures that a pending PCI configuration cycle can be serviced after the PCI clock to NIC resources are restored. PCI pending handler 105 also ensures that serial bus 103' is not active before responding to a preconfiguration request signal from PCI retry logic 106.

After reset, PCI pending handler 105 enters an idle state (602). When PCI pending handler 105 receives a preconfiguration request signal (preConfigReq) from PCI retry logic 106, PCI pending handler 105 will enter a stop serial request state (STOP_SERIAL_REQ) (604) and send a stop serial request (stopSerialReq) to serial bus interface 103" and wait for a stop serial acknowledge signal (stopSerialAck) to be returned from serial bus interface 103". The stop serial acknowledge signal indicates the completion of the current access through serial bus 103'. PCI pending handler 105 will then enter a configuration request state (CONFIG_REQ) (606) and send a configuration request signal (configReq) instructing clock control 108 to switch from the ASIC clock to the PCI clock. PCI pending handler 105 will monitor the completion of the switch through assertion of the PCI clock enable signal (pciClkEn). PCI pending handler 105 will then enter a wait state (WAIT_CONFIG) (608) until it receives a FRAME signal from PCI host 102 and an incoming configuration cycle signal (myConfigCycle) from PCI pending decoder 107, indicating that PCI host 102 is retrying the PCI configuration cycle. After servicing the configuration cycle, PCI pending handler 105 will receive a target ready signal (TRDY) from PCI interface 102" indicating that the configuration cycle is done. PCI pending handler 105 will then enter a configuration done state (CONFIG_DONE) (610) and send a configuration done signal (configDone) to clock control 108. Clock control 108 switches the clock back to the ASIC clock if the PC is still in the power down mode to allow access through an alternate path, otherwise NIC 100 will continue to run off of the PCI clock.

The method and apparatus for using NIC resources without main power enables a NIC to support intelligent management functions. By constantly monitoring PCI bus activity, the NIC can seamlessly switch its functional blocks to either the normal usage when PCI power is coming up, or the advanced management functions when PCI power is not available. By allowing NIC diagnostics, sending out keep alive and alert-on-LAN packets, as well as uploading received packets through an alternate path, greater PC management capabilities may be achieved.

While the invention has been described in terms of some specific examples and in some specific embodiments, it will be clear that this invention is not limited to these specific examples and embodiments and that many changes and modified embodiments will be obvious to those skilled in the art without departing from the true spirit and scope of the invention as defined in the appended claims.

What is claimed is:

1. A network interface card, comprising:
    an alternate access path for allowing access to resources of the network interface card when the network interface card is in a low power consumption mode;
    a clock control for supplying an ASIC clock signal to the network interface card when the network interface card is in a low power consumption mode, the ASIC clock signal providing a clock signal for the alternate access path; and
    a PCI activity monitor capable of detecting a PCI configuration cycle from a PCI host addressed to the network interface card when the network interface card is in the low power consumption mode, the PCI activity monitor capable of sending a stop request to the alternate access path, the PCI activity monitor capable of sending a retry signal to the PCI host, the PCI activity monitor capable of instructing the clock control to switch from the ASIC clock signal to a PCI clock signal in response to detecting the PCI configuration cycle, the PCI clock signal providing the clock signal to the network interface card to service the PCI configuration cycle.

2. The network interface card of claim 1, wherein the alternate access path is a serial bus.

3. The network interface card of claim 1, wherein a PCI power and a PCI clock signal are not available in the low power consumption mode.

4. The network interface card of claim 1, wherein the PCI activity monitor is also capable of deasserting the stop request to the alternate access path and instructing the clock control to switch from the PCI clock signal back to the ASIC clock signal after the PCI configuration cycle has been serviced by the network interface card if the network interface card is still in the low power consumption mode.

5. A method for servicing a PCI configuration cycle to a network interface card when the network interface card is in a low power consumption mode, the method comprising:
    detecting a PCI configuration cycle from a PCI host addressed to the network interface card when the network interface card is in a low power consumption mode;
    sending a stop request to an alternate access path to the network interface card to stop access by the alternate access path to the network interface card;
    sending a retry signal to the PCI host so that the PCI host will resend the PCI configuration cycle;
    switching a clock signal from an ASIC clock signal to a PCI clock signal so that the PCI configuration cycle may be serviced.

6. The method of claim 5, wherein the alternate access path is a serial bus.

7. The method of claim 5, wherein a PCI power and a PCI clock signal are not available in the low power consumption mode.

8. The method of claim 5, further comprising:
    deasserting the stop request to the alternate access path to allow access by the alternate access path to the network interface card;
    instructing the clock control to switch from the PCI clock signal back to the ASIC clock signal after the PCI configuration cycle has been serviced by the network interface card if the network interface card is still in the low power consumption mode.

* * * * *